(12) United States Patent
Guru et al.

(10) Patent No.: US 11,689,439 B2
(45) Date of Patent: Jun. 27, 2023

(54) METHOD AND APPARATUS FOR COMMUNICATION WITH A MOTOR OR LOAD MOUNTED DEVICE IN MOTION APPLICATIONS

(71) Applicant: Rockwell Automation Technologies, Inc., Mayfield Heights, OH (US)

(72) Inventors: Arun K. Guru, Brookfield, WI (US); Dayin Xu, Shanghai (CN); John Figie, Germantown, WI (US); Fuhua Ding, East Setauket, NY (US); Chetan Chandrasekara, Chanhassen, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 201 days.

(21) Appl. No.: 17/034,270

(22) Filed: Sep. 28, 2020

(65) Prior Publication Data
US 2022/0103449 A1   Mar. 31, 2022

(51) Int. Cl.
| | |
|---|---|
| H04L 43/0852 | (2022.01) |
| H02P 29/00 | (2016.01) |
| H04L 12/64 | (2006.01) |
| H04L 43/106 | (2022.01) |
| G01D 5/244 | (2006.01) |

(52) U.S. Cl.
CPC ......... *H04L 43/0852* (2013.01); *G01D 5/244* (2013.01); *H02P 29/00* (2013.01); *H04L 12/6418* (2013.01); *H04L 43/106* (2013.01); *H04L 2012/6454* (2013.01)

(58) Field of Classification Search
None
See application file for complete search history.

(56) References Cited

U.S. PATENT DOCUMENTS

| | | |
|---|---|---|
| 6,640,308 B1 | 10/2003 | Keyghobad et al. |
| 9,673,685 B2 | 6/2017 | Cooper et al. |
| 2014/0241491 A1* | 8/2014 | Dong ................. A61B 6/547 378/20 |

(Continued)

OTHER PUBLICATIONS

Huston, Geoff. "Protocol basics: the network time protocol." APNIC Lab 10.03 (2014), https://labs.apnic.net/?p=462.*

*Primary Examiner* — Mohamed A. Wasel
*Assistant Examiner* — Gregory P Tolchinsky
(74) *Attorney, Agent, or Firm* — Boyle Fredrickson, SC

(57) ABSTRACT

A communication module mounted to a motor provides for communication between a motor controller and a motor or between the motor controller and devices mounted on or proximate to the motor. The communication module may be configured to accept signals from various different encoders and/or load devices mounted on or proximate to the motor. The communication module receives a position feedback signal from a primary encoder interface and is configured to transmit the data to the motor controller at a periodic update rate. The communication module also receives feedback signals from at least one additional device and transmits the data to the motor controller. The communication module synchronizes its periodic update rate with the motor controller such that the position feedback signal may be utilized to control operation of the motor. The additional feedback signals may be communicated at the same or differing update rates.

20 Claims, 3 Drawing Sheets

(56) References Cited

U.S. PATENT DOCUMENTS

| | | | |
|---|---|---|---|
| 2020/0310786 A1* | 10/2020 | Mikhailov | G06F 11/3089 |
| 2021/0286748 A1* | 9/2021 | Brychta | G06F 13/4068 |
| 2021/0370975 A1* | 12/2021 | Cass | G05D 1/0088 |
| 2022/0067974 A1* | 3/2022 | Gunkel | G06T 7/50 |
| 2022/0078099 A1* | 3/2022 | Zhohov | H04L 41/14 |

* cited by examiner

METHOD AND APPARATUS FOR COMMUNICATION WITH A MOTOR OR LOAD MOUNTED DEVICE IN MOTION APPLICATIONS

BACKGROUND INFORMATION

The subject matter disclosed herein relates generally to a method and system for communication with a motor or load mounted device in a motion application and, more specifically, to a method and system for communication with the motor or load mounted devices from a remote device via a single-pair Ethernet connection and a communication module mounted on the motor.

Electric motors are commonly utilized for controlling motion in industrial applications. Motors may be used to drive conveyor belts, winding equipment, robots, pick and place machinery, and the like. Electric motors are commonly paired with a motor controller and a position feedback device where the motor controller may include algorithms paired with the motor and the position feedback device facilitates angular positioning of the motor.

Commonly, electric motors and motor controllers are incorporated into a larger controlled machine, system, or process. The controlled machine, system, or process may include a central controller, one or more distributed industrial controllers, and often multiple motors and motor controllers. The central controller may be a desktop computer located in a control room or in a remote facility. Optionally, the central controller may be an industrial computer, configured to operate in a harsh environment and located at the controlled machine, system, or process. The industrial controllers include processors and operating systems optimized for real-time control and are programmed with languages designed to permit rapid development of control programs tailored to a constantly varying set of machine control or process control applications.

An industrial control network is typically employed to facilitate communications between devices in the controlled machine, system, or process. The industrial networks are typically selected to exhibit high reliability and real-time communication. The industrial network may utilize protocols such as EtherCAT®, Ethernet/IP®, or Profinet® which have been developed for automation applications and include features such as a guaranteed maximum communication delay, low communication jitter, pre-scheduling of the communication capacity of the network, and/or providing seamless redundant communication capabilities for high-availability.

Historically, it has been known to install the network between controllers, such as the central controller and the industrial controller. Further, certain devices such as motor drives may be configurable, include a large parameter set, have sufficient processing capabilities, or the like such that they may include a network interface and are also connected to the industrial network. Other devices, however, such as motors, sensors, relays, and other actuators, provide input signals to or receive output signals from one of the controllers and perform fixed tasks in the controlled machine, system, or process. These devices are typically located remotely, and often at long runs, from the control cabinets in which the controllers are located. Wiring must be run between the control cabinets and each of the devices. Because of the expense of running network cabling to and providing network interfaces on every device, many of these devices are not connected directly to the network. The input and/or output signals are transmitted directly between one of the controllers and the device. Optionally groups of signals may be routed to an intermediate location and pass through a gateway which is connected to the industrial network and which can convert the input and output signals from separate signals to data in a message packet to be transmitted via the desired industrial protocol for at least a portion of the distance between the controllers and the devices.

Traditionally, a motor controller has served as a gateway in the industrial network. The motor controller includes a network interface and is configured to communicate via the industrial network. The motor controller also communicates on a point-to-point basis to transmit and receive output and input signals with devices connected to the motor controller. The devices include, for example, a brake on the motor, a temperature sensor, a vibration sensor, or a position encoder mounted on the motor.

However, recent trends have been to include additional sensors on the motor or other load mounted devices to monitor operating conditions in the motor. The additional sensors may include, for example, vibration sensors mounted to the motor as disclosed in U.S. Pat. No. 9,673,685 to measure the vibration present on the motor. Temperature sensors may be mounted at different locations on the motor, encoder, gearbox, or the like to provide information on ambient conditions or to provide early detection of an impending failure in the motor. Torque transducers or accelerometers may be provided to measure performance of the motor.

The addition of these devices communicating with the motor controller requires additional wiring between each of the devices and the motor controller. The motor controller must also be configured to communicate with each device. Different communications protocols may be utilized by different devices, requiring the motor controller to accept each of the communication protocols. Certain communications are unidirectional, providing, for example, data from a sensor to the motor controller, but preventing, for example, configuration of the sensor by the motor controller. For devices that allow bidirectional communication with the motor controller, the communication is restricted to the motor controller and does not provide for extended communication with the device over the industrial network. Further, the additional signals utilize processing bandwidth of the motor controller to sample each signal and to perform subsequent processing on the signal, such as storing the signal, converting the signal from an analog value to a digital value, packing the value of the signal into a data packet for transmission to the industrial controller, or the like as required by the application. Increasing complexity and more demanding performance requirements for control routines to control operation of the motor place competing demands on the resources of the motor controller.

Thus, it would be desirable to provide an improved method and system for communication between a motor controller and a motor or between the motor controller and devices mounted on or proximate to the motor.

BRIEF DESCRIPTION

According to one embodiment of the invention a system for controlling operation of a motor connected to a motor controller includes a first Ethernet communication interface in the motor controller, an encoder mounted to the motor, and a communication module mounted proximate to the motor and operatively connected to the motor controller. The first Ethernet communication interface is configured to transmit a position read request from the motor controller to the motor at a first periodic interval, and the encoder is configured to generate an output signal corresponding to an angular position of the motor. The communication module includes a second Ethernet communication interface and a processor configured to execute at a second periodic interval synchronized to the first periodic interval, obtain a sampled value of the output signal corresponding to the angular position of the motor from the encoder at a start of the second periodic interval, and transmit the sampled value of the output signal corresponding to the angular position of the motor to the motor controller in response to receiving the position read request. The motor controller is configured to control operation of the motor responsive to receiving the sampled value of the output signal from the communication module.

According to another embodiment of the invention, a communication module configured to be mounted proximate to a motor for use in controlling operation of the motor includes an Ethernet communication interface and a processor. The processor is configured to execute at a first periodic interval and to synchronize the first periodic interval of the communication module to a second periodic interval in a motor controller operatively connected to the motor. The processor obtains a sampled value of an encoder feedback signal at a start of the first periodic interval, where the encoder feedback signal is generated by an encoder mounted to the motor and the encoder feedback signal corresponds to an angular position of the motor. The processor receives a position read request from the motor controller, where the position read request is transmitted from the motor controller at the second periodic interval. The processor transmits the sampled value of the encoder feedback signal to the motor controller in response to receiving the position read request, and the motor controller is configured to control operation of the motor responsive to receiving the encoder feedback signal from the communication module.

According to still another embodiment of the invention, a method for communicating at least one feedback signal between a motor controller and at least one device mounted proximate to a motor operatively connected to the motor controller is disclosed. A second periodic interval, executing on a communication module mounted in the motor, is synchronized with a first periodic interval, executing on the motor controller. A position feedback signal, received from an encoder at the communication module, is sampled, where the sampling occurs at a start of the second periodic interval. A position read request is received from the motor controller at the communication module, and the position feedback signal, sampled at the start of the second periodic interval, is transmitted from the communication module to the motor controller responsive to the position read request.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
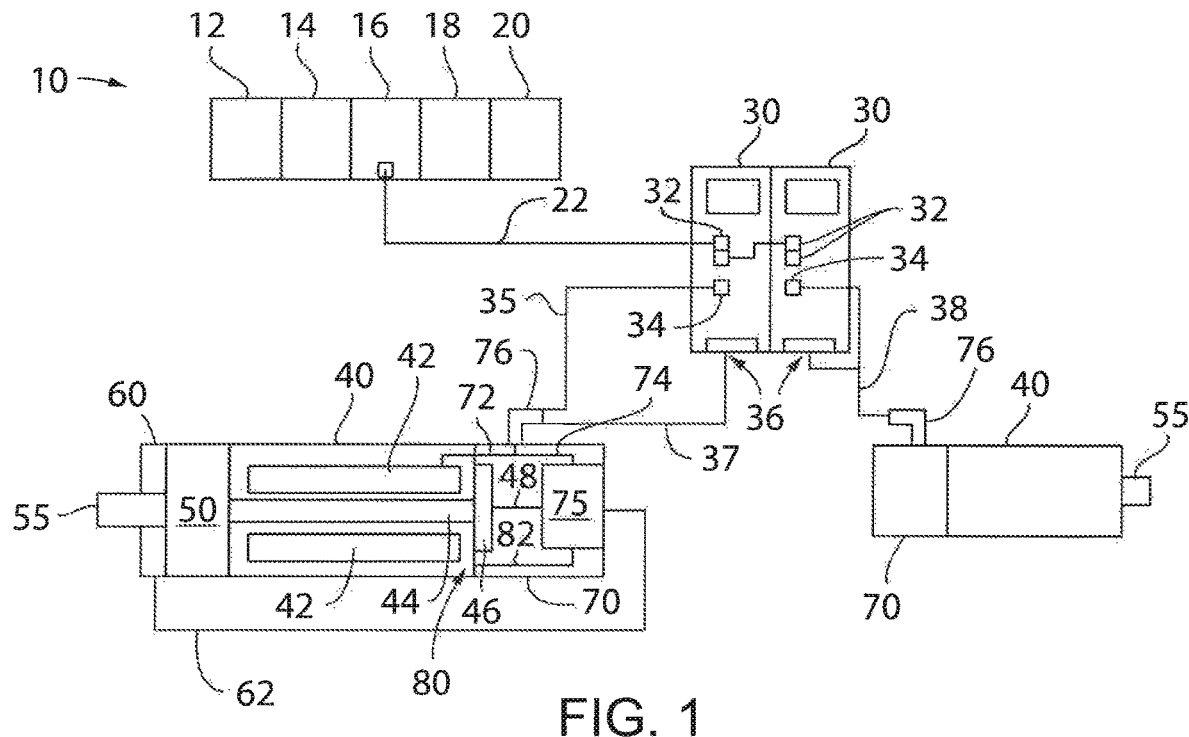
FIG. 1 is a schematic representation of an exemplary motion application illustrating alternate embodiments of communicating with a motor.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein provides an improved method and system for communication between a motor controller and a motor or between the motor controller and devices mounted on or proximate to the motor. A communication module is mounted to the motor and is configured to communicate with the motor controller. To further simplify wiring, a two-wire, Single Pair Ethernet interface with power supplied over the two data lines may be utilized between the communication module and the motor controller. The communication module may be configured to accept different encoders and/or load devices mounted on or proximate to the motor.

According to one embodiment of the invention, the communication module includes a primary encoder interface configured to receive data from a first encoder operatively mounted on the motor which provides information on the angular position of the motor. The communication module may also include a secondary encoder interface configured to receive data from a second encoder. The second encoder may be mounted, for example, at a location along the output of the motor, a gearbox connected to the motor, or on the load and is used to verify operation of the motor and/or a mechanical coupling between the motor. Similarly, the second encoder may be coupled to and verify operation of an element of the controlled machine or process that is driven by the motor. The communication module further includes at least one additional input. Each additional input may be a digital signal, an analog signal, or a serial input corresponding, for example, to a temperature, vibration, load torque, or other operating parameter being monitored by a sensor on the motor, gearbox, or located in proximity to the motor. The communication module includes a sensor interface circuit configured to receive the input from each encoder and each additional sensor and transfer the input signals to a processing unit located within the communication module.

The processing unit is configured to transmit the input signals back to the motor controller. Because the communication module is connected to the motor controller via a two-wire, Single Pair Ethernet interface, the processing unit may assemble data received from the input signals into data packets for transmission. In addition, the communication module may assemble the data packets according to the protocol present on the industrial network connected between the motor controller and an industrial controller or central controller present in the controlled system and transmit data directly to the industrial controller or central controller with the motor controller acting solely as a gateway through which the data passes. When data is transmitted directly from the communication module to the industrial controller or central controller, a network interface located in the motor controller may handle all of the processing of the data packet without routing the data packet to the processor of the motor controller, thereby eliminating the processing burden for gateway functions from the processor of the motor controller.

The processing unit may also be configured to perform some initial functions on the incoming data. The communication module includes memory and may store a number of data samples. The processing unit may, for example, assemble multiple samples for a single transmission to the motor controller or back to the industrial controller. The processing unit may be configured to perform some initial analysis of the data, for example, converting the raw encoder data to an angular position or angular velocity prior to transmitting the data. The processing unit may be configured to store a baseline value of a data signal or to store data over an extended period of time and monitor the input data for changes over time. By detecting a change over time, the processing unit may generate a signal indicating a failure of a device or generate a signal indicating preventive maintenance is required.

It is further contemplated that the processing unit may be configured to transmit data at different update rates. Raw data from the encoder, for example, may be utilized by the motor controller for real time control. This data from the encoder, or encoders, may be transmitted at a fast update rate. Other data, such as an input signal from a temperature sensor may not change rapidly. The processing unit may be configured to transmit this data at a slower update rate, where the slower update rate may be configurable and range from milliseconds to seconds or longer according to the application requirements. It is also contemplated that the processing unit may be configured to communicate with the motor controller to synchronize execution of one or more of the periodic updates in the communication module with a periodic routine executing in the motor controller.

Turning initially to FIG. 1, an exemplary industrial controller 10 is provided to control operation of an industrial machine or process. The illustrated industrial controller 10 includes a power supply module 12, a processor module 14, a communication module 16, an input module 18 and an output module 20. It is understood that the industrial controller 10 may include numerous different configurations. An industrial controller may include a rack or multiple racks in which modules are inserted. A backplane may extend along a rack for communication between modules and an industrial network may be configured for communication between remote racks or other devices within the controlled machine or process. Still other industrial controllers may include a fixed configuration, having a predefined processor, communication interface, inputs, and outputs. The illustrated industrial controller 10 is intended to be exemplary and not limiting.

The processor module 14 is configured to execute a control program or a series of different programs, in series, in parallel, or a combination thereof to achieve desired operation of the controlled machine or process. Motion in the controlled machine or process may be achieved by controlling operation of one or more motors 40 with a motor drive 30, also referred to herein as a motor controller. Each motor drive 30 and the corresponding motor 40 to be controlled by the motor drive 30 are sometimes referred to as an axis of motion. The control program executing in the processor module 14 may be configured to generate motion commands to achieve the desired operation of the machine or process. Optionally, one or more dedicated motion modules may be included in the industrial controller 10 to generate the motion commands. These motion commands are, in turn, transmitted to the motor controller 30.

According to the illustrated embodiment, a network cable 22 is connected between the communication module 16 and the motor controller 30 across which the motion command may be transmitted. Optionally, the network cable 22 may be connected directly to the processor module 14, or the network cable 22 may be connected to a motion module included in the industrial controller 10. Each motor controller 30 includes at least one network communication port 32. According to the illustrated embodiment, each motor controller 30 includes a pair of communication ports 32 such that multiple motor controllers 30 may be connected in a daisy-chain configuration. A first communication port 32 on a first motor controller 30 is connected to the communication module 16, and a second communication port 32 on the first motor controller 30 is connected to a first communication port 32 on a second motor controller 30. Still additional motor controllers 30 could be connected in a similar manner from the second communication port 32 of the second motor controller 30.

Each motor controller 30 is operatively connected to a motor 40 and is configured to control operation of the connected motor. According to one embodiment of the invention, a pair of cables 35, 37 may extend between the motor controller 30 and the motor 40. A first cable 35 may be utilized for communication between the motor controller 30 and the motor 40. The first cable 35 is connected between a motor communication port 34 on the motor controller 30 and connector 76 on the motor 40. Within the motor 40, internal communication conductors 74 extend between the connector 76 and a communication module 75 mounted within an end bell 70 of the motor 40. The internal conductors 74 may be wires, a cable, traces on a circuit board, or a combination thereof. The second cable 37 may be utilized for supplying power to the stator 42 of the motor 40. The second cable 37 is connected between output terminals 36 on the motor controller 30 and the connector 76 on the motor 40. Internal motor conductors 72 extend between the connector 76 and the stator 42 to provide voltage to control rotation of the motor 40.

According to another embodiment of the invention, a single cable 38 may extend between the motor controller 30 and the motor 40. The single cable 38 may be configured to provide both power and supply communication between the motor controller 30 and the motor 40. According to the illustrated embodiment, one end of the single cable 38 includes a first connector configured to plug into the motor communication port 34 and a second connector configured to connect to the output terminals 36. Optionally, the motor controller 30 may be configured to have a single connector or a set of terminals positioned next to each other to which the single cable 38 may be connected.

Each motor 40 includes a stator 42 and a rotor 44. In many applications, it is desirable for the motor controller 30 to have knowledge of an angular position of the rotor 44. An encoder 46 may be mounted to one side of the rotor 44, where the encoder 46 is configured to generate a position feedback signal 48 corresponding to the angular position of the rotor 44. The other end of the rotor 44 is connected to a drive assembly 50 by which the controlled machine or process operates. Optionally, the encoder 46 may include passive and active components. The passive components may be, for example, a pair of magnets mounted to the end of the rotor 44 and the active components may include a sensor mounted to the communication module 75, where the sensor generates a position feedback signal corresponding to rotation of the magnets. Optionally, the passive components may be a series of teeth milled on or otherwise mounted to a surface which is, in turn, mounted to the end of the rotor 44. The active components may include a magnet and a magnetic field sensor mounted on the communication module 75. The magnet generates a magnetic field which is intersected by the teeth rotating through the field. As the teeth rotate, the magnetic flux tends to follow the teeth as they pass through the magnetic field and the magnetic field sensor is positioned within the magnetic field such that it detects the variation in the magnetic flux.

It is contemplated that the drive assembly 50 may be a gearbox, a pulley, a drive chain, a ball screw, other drive members, or a combination thereof by which a desired motion in the controlled machine or process is obtained as a result of rotation of the rotor 44 within the motor 40. In certain applications, such as robotic motion, it may be desirable to provide a second encoder 60 at the output of the drive assembly 50 where the second encoder 60 may be operatively connected to an output drive member 55 from the drive assembly 50. The second encoder 60 may be used to verify an angular position of an end effector or tool located at the output of the drive assembly 50 and the second encoder 60 provides a second position feedback signal 62.

It is further contemplated that the motor 40 may include still additional devices mounted on or proximate to the motor, where the additional device generate signals corresponding to operation of the motor 40, the drive assembly 50, or of other aspects of the controlled machine or process. It is contemplated that the additional devices may be sensors configured to measure, for example, temperature, angular acceleration, vibration, orientation, proximity, a level, an open or closed contact, and the like. According to the embodiment illustrated in FIG. 1, a temperature sensor 80 is mounted in the body of the motor, where the temperature sensor is configured to generate a temperature feedback signal 82. According to the embodiment illustrated in FIG. 2, a non-contact temperature sensor 81, such as an infrared sensor, may be provided to detect heat, H, radiated from the motor 40. The non-contact temperature sensor 81 is similarly configured to generate a temperature feedback signal 82. Each of the feedback signals, including the position feedback signal 48, the second position feedback signal 62, the temperature feedback signal 82, or any other feedback signals generated by other devices mounted on or proximate to the motor 40 are provided to the communication module 75 for subsequent transmission back to the motor controller 30.

Figure 2:
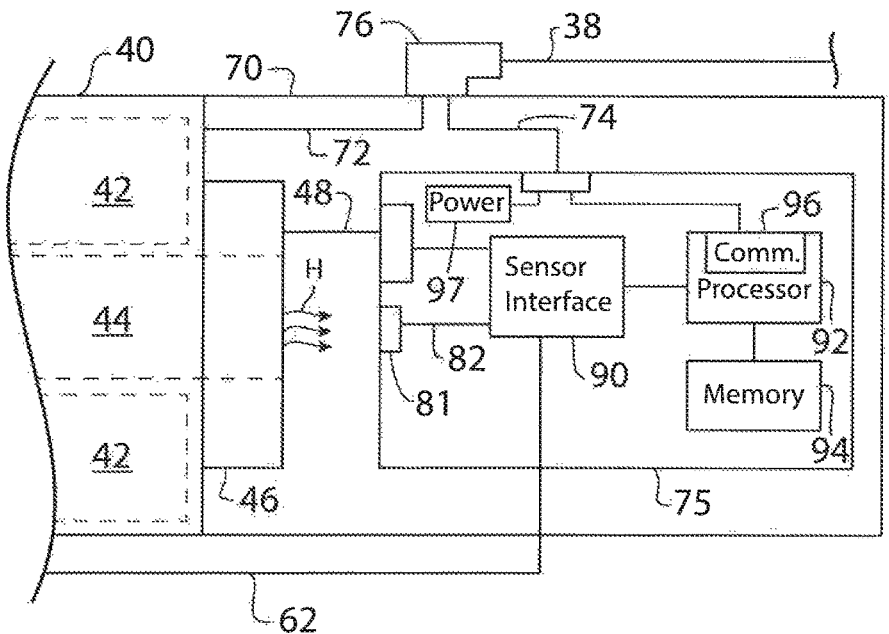
FIG. 2 is a partial block diagram representation of one embodiment of communicating with a motor as shown in FIG. 1.

Turning next to FIG. 2, the communication module 75 includes a sensor interface 90 configured to receive each of the feedback signals provided to the communication module. The sensor interface 90 may include, for example, buffers to temporarily store values of the feedback signals or analog-to-digital converters to convert an analog feedback signal to a digital feedback signal. The sensor interface 90 includes circuitry and components to receive and process the feedback signals to a suitable form for the processor 92. The processor 92 is in communication with memory 94 and is configured to execute a series of instructions stored in the memory 94. The processor 92 may be a single processor, multiple processors, or multiple processing cores arranged on a single device. The processor 92 may be configured to execute a single series of instructions or multiple series of instructions asynchronously, synchronously, in series, or in tandem. The memory 94 may be a single device or multiple devices and includes at least a portion of non-volatile memory.

The communication module 75 also includes a communication interface 96 for managing communication with the motor controller 30. According to one embodiment of the invention, the communication interface 96 is an Ethernet interface. Similarly, the communication port 34 on the motor controller 30 is an Ethernet port. If the network between the industrial controller 10 and the motor controller 30 is similarly an Ethernet network, or an industrial Ethernet network, data packets may be transmitted between the communication module 75 on the motor 40 and the motor controller 30 or between the communication module 75 and other devices, such as the industrial controller 10, connected to the network. The communication interface 96 may be an integral component of the processor 92 or, optionally, a separate communication interface 96 may be arranged on a common printed circuit (PC) substrate to which the interface 96 and processor 92 may be mounted. The communication interface 96 is configured to transmit and receive data packets over the network according to the protocol of the network, where the protocol is preferably an industrial network protocol, such as Ethernet/IP®, DeviceNet®, ControlNet®, or CompoNet®.

Typically, a motor controller 30 has served as a final node in an industrial network. Position feedback data or data from other sensors/devices mounted on or proximate to the motor 40 are first transmitted to the motor controller 30 and then may be transmitted over the network. Similarly, if a sensor is, for example, a smart sensor with the ability to be remotely configured, the motor controller 30 must be configured to first receive the configuration packet and then a communication interface between the motor controller 30 and the sensor must be established to pass on the configuration data. Operating in such a capacity, however, places extra demands on the motor controller 30. The motor controller 30 must be configured with additional inputs and outputs configured to receive or send signals with the devices mounted on or proximate to the motor 40. Similarly, a portion of the processing bandwidth in the motor controller is required to serve as a gateway to receive the data feedback signals, package these signals into data packets, and transmit them to the industrial controller 10. Dedicated wiring between each device and the motor controller 30 is also required. As the number of devices located on or proximate to the motor 40 increases, the number of conductors required increases, increasing the physical space required for wiring, reducing the flexibility of bundled wires, and increasing the potential for a wiring error to occur.

Inclusion of the communication module 75 in the motor 40 reduces the processing demands placed on the motor controller 30 and simplifies wiring between the motor 40 and the motor controller 30. The communication module 75 receives the feedback signals from the devices at the sensor interface 90 and converts the feedback signals to digital values suitable for use in a digital processor. The processor 92 in the communication module 75 may transmit a data packet to the motor controller 30 if the feedback signal, such as angular position of the motor, is intended for the motor controller 30 or may transmit the data packet back to the industrial controller 10 if the feedback signal, is needed for the control program executing in the processor module 14 of the industrial controller. Wiring between the motor controller 30 and the motor 40 may be reduced to the pair of cables 35, 37 or even to a single cable 38 as shown in FIG. 1. In one embodiment of the invention, the communication cable 35 or the portion of the single cable 38 configured for communication may be a single-pair Ethernet cable, including just two conductors. The power cable 37 or the portion of the single cable 38 configured to conduct power includes four conductors, where three conductors supply the voltage for each of the three phases of the motor and the fourth conductor is a ground conductor. The total necessary conductors, therefore, may be limited to just six conductors. To prevent the need for any additional conductors, the control power for the communication module 75 may also be supplied over the single-pair Ethernet cable. As shown in FIG. 2, the internal conductors 74 connected to the external single-pair Ethernet conductors may be divided on the PC substrate to deliver control power to a power section 97 and the data packet to the communication interface 96.

In a motion application, precise control of the motor 40 requires that the motor controller 30 receives the angular position of the motor 40. In addition to receiving the angular position, the motor controller 30 must obtain the sampled value at precise intervals and, preferably, at a consistent time during the interval (i.e., without jitter). A control algorithm executing within the motor controller 30 similarly executes at the same interval as the angular position is sampled or at multiples of the interval. Therefore, the motor controller 30 must coordinate with the communication module 75 to obtain the angular position at a desired time interval.

Figure 3:
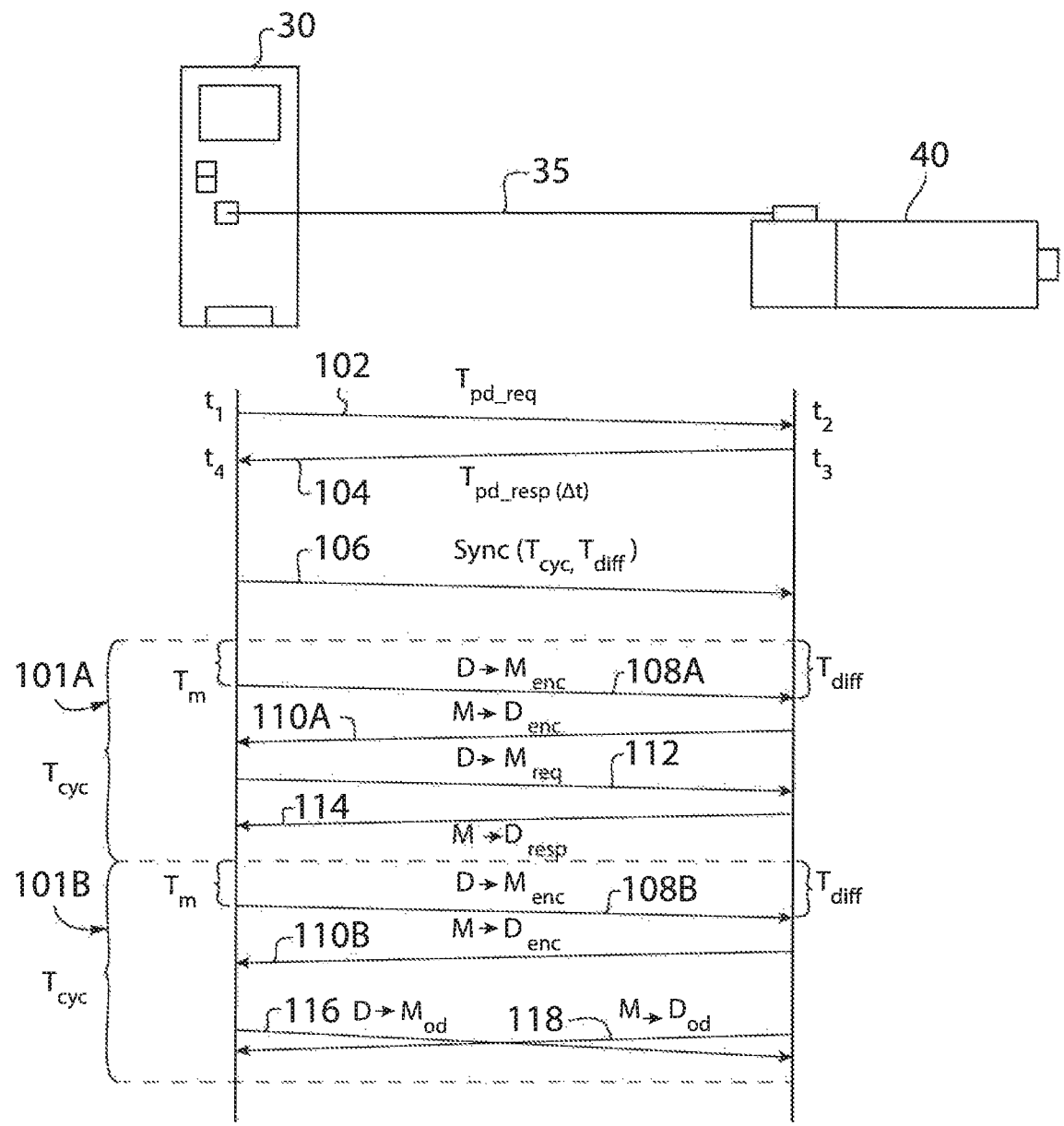
FIG. 3 is a timing diagram of one embodiment of communication between a motor controller and a motor according to the exemplary motion application of FIG. 1.

Turning next to FIG. 3, a timing diagram for establishing communication between the motor controller 30 and the motor 40 is illustrated. Three data packets are transmitted between the motor controller 30 and the communication module 75 in the motor 40 to establish synchronous periodic execution between the motor controller 30 and the communication module 75. An initial data packet 102, $T_{pd\_req}$, is transmitted from the motor controller 30 to the motor 40 at time, $t_1$. The initial data packet 102 may be time-stamped in the motor controller 30 upon transmission and the motor controller 30 stores the value of the first time, $t_1$, in memory. The data packet 102 is also time-stamped at the communication module 75 upon receipt at time, $t_2$. The second time, $t_2$, may be stored in memory 94 on the communication module 75. The communication module 75 generates a responsive data packet 104, $T_{pd\_resp}$, which is sent back to the motor controller 30 at a third time, $t_3$. The communication module 75 may be configured to transmit the responsive data packet 104 at a predefined time interval after receiving the initial request data packet 102. Alternately, the communication module may measure the time between the second time, $t_2$, and the third time, $t_3$. Either the predefined time or the measured duration between receiving the initial data packet 102 at the second time, $t_2$, and sending the responsive data packet 104 at the third time, $t_3$, is defined as the delay time, $\Delta_t$, within the communication module. This delay time, $\Delta_t$, is transmitted to the motor controller 30 in order to determine the path delay time. Finally, the responsive data packet 104 is received by the motor controller 30 at a fourth time, $t_4$. Receipt of the responsive data packet 104 is timestamped and the first time, fourth time, and delay time are utilized as shown below in Equation 1 to determine a one-way transmission delay, $T_{pd}$, between the motor controller 30 and the communication module 75.

$$T_{pd}=(t_4-t_1-\Delta t)/2 \qquad (1)$$

The motor controller 30 utilizes the value of the one-way transmission delay, $T_{pd}$, to determine a compensation time, $T_{diff}$, for the communication module 75. This compensation time, $T_{diff}$, is equal to a packet start time, $T_m$, added to the one-way transmission delay, $T_{pd}$, determined in the initial steps. The packet start time corresponds to an expected duration from the start of the periodic cycle to a time within the periodic cycle that the motor controller 30 will transmit a data packet to the communication module 75. Adding the packet start time, $T_m$, to the transmission delay, $\Delta t$, determines a total expected time between the start of a periodic cycle and the reception of the data packet at the communication module 75. The motor controller 30 then generates a synchronize message packet 106, Sync, which includes the total cycle time, $T_{cyc}$, for the periodic cycle as configured within the motor controller 30 and the compensation time, $T_{diff}$, for the communication module 75.

After receiving the total cycle time, $T_{cyc}$, for the periodic cycle and the compensation time, $T_{diff}$, the motor controller 30 and the communication module 75 may begin synchronized communications. As shown in FIG. 3, two cycles 101 of communication between the motor controller 30 and the communication module 75 are illustrated. In each cycle 101, the motor controller 30 sends a packet 108 requesting a value of the angular position of the motor 40, and the communication module 75 responds with a packet 110 which includes the angular position of the motor 40. After processing the request and response for the angular position of the motor 40, additional data packets may be transmitted for additional data transfer between the motor controller 30 and the motor 40.

Turning initially to the first communication cycle 101A, the motor controller 30, acting as the master device for synchronization, transmits the angular position request packet 108A at the packet start time, $T_m$. The angular position request packet 108A is received at the communication module 75 in the motor 40 after a duration equal to the transmission delay, $\Delta t$, from when the packet is sent. This total time, as previously indicated, is equal to the compensation time, $T_{diff}$, for the communication module 75. The communication module 75, having the total cycle time, $T_{cyc}$, for the periodic cycle and the compensation time, $T_{diff}$, knows how much time is left in the present cycle and when the next cycle is to begin. The communication module 75 may then begin maintaining a periodic cycle that is synchronous with the periodic cycle in the motor controller 30. Consequently, the length of the periodic cycle may be adjusted within the motor controller 30 and the corresponding periodic cycle in the communication module 75 is synchronized to the periodic cycle in the motor controller 30 after retransmitting the synchronization data packets.

Upon receiving the angular position request packet 108A, the communication module 75 builds an angular position response packet 110A and stores a present value of the angular position in the packet. The communication module 75 then transmits this angular position response packet 110A back to the motor controller 30. Additionally, for every periodic cycle 101 subsequent to the initial periodic cycle, the communication module 75 obtains a value of the angular position of the motor 40 from the encoder 46 at the start of the next periodic cycle. In this manner, the motor controller 30 may execute a control algorithm to control operation of the motor 40 with the expectation that the angular position is sampled at the start of each periodic cycle. Optionally, it may be desirable to sample the angular position twice during a periodic cycle. After initially synchronizing the two periodic cycles of the motor controller 30 and the communication module 75, the communication module may similarly sample the angular position of the motor, for example, at the start of each period and at the midpoint of each period. The motor controller 30 may send a single read request to which the communication module 75 sends a response containing two sampled values or the motor controller 30 may send a pair of read requests to which the communication module 75 sends a response to each request, where each response includes a single sampled value. In this manner, the motor controller 30 and the communication module 75 work together to ensure that the angular position is sampled at precise intervals and at a consistent time during the interval. Because the motor controller 30 requires these angular position values at precise intervals, the first portion of each cycle may be reserved for transmission of the angular position request and response packets 108A, 110A. A second portion of each cycle may be allocated to other communications between the motor controller 30 and the motor 40.

According to another aspect of the invention, it is contemplated that other data in addition to the angular position of the motor may need to be sent within the first portion of each cycle. In one application, the second encoder 60 may be mounted to provide a check on the first encoder 46 or to verify operation of the mechanical drive train. The angular position from the second encoder 60 may similarly be sampled at the start of each cycle and both angular position values may be packaged into the angular response packet 110 and transmitted to the motor controller 30. In another application, it may be desirable for the motor controller 30 to have data from one or more of the sensors mounted proximate to the motor at the same frequency as the angular position of the motor. A vibration sensor, for example, may be mounted to the motor and generate a feedback signal corresponding to vibration measured on the motor 40. The value of the vibration feedback signal may be packaged within the angular response packet 110 and transmitted to the motor controller 30 in tandem with the angular position. It is contemplated that the data to be sent in the angular response packet 110 is configurable within the motor controller 30 and the motor controller 30 can send an initial configuration packet, for example, during power up or during a commissioning process to configure the communication module accordingly to transmit the desired data at the periodic frequency during the first portion of the cycle 101.

According to still another aspect of the invention, it is contemplated that data may be transmitted to the communication module 75 from the motor controller 30 within the angular position request packet 108. The motor controller 30 may, for example, control operation of a brake on the motor 40 via serial communication. It may be desirable to transmit a command signal to the motor 40 at the same periodic interval at which the angular position data is requested. The angular position request packet 108 may include a status bit or status work within the data packet in which a command signal for the brake is provided. The status bit may be set to a logical one when the motor controller 30 wants the brake open and to a logical zero when the motor controller 30 wants the brake set. A feedback signal from a sensor indicating whether the brake is open or closed may generate a binary feedback signal and a status bit or status word may similarly be included within the angular response packet 110 to provide the motor controller 30 with the current state of the brake. Optionally, the brake command and brake status signals may not be required as frequently and may be transmitted in an on-demand message as will be discussed next.

As discussed above, the communication module 75 is configured to receive feedback signals not only from the encoder 46 but also from other devices mounted on or proximate to the motor 40. The motor controller 30 and/or the industrial controller 10 periodically requires values of the feedback signals. However, the timing for obtaining values of the other feedback signals is typically not as critical and/or does not require as frequent updates. The motor controller 30, for example, may execute a routine which generates pulse-width modulation (PWM) signals to control operation of the motor 40 at a frequency in the range of two to twenty kilohertz (2-20 kHz) and some applications may require a PWM frequency even greater than twenty kilohertz. An exemplary application may require the PWM frequency to be set to ten kilohertz (10 kHz). The duration of each period is then one hundred microseconds (100 µsec). In contrast, the industrial controller 10 or the motor controller 30 may only require knowledge of other sensor feedback signals every five or ten milliseconds (5-10 msec). These feedback signals may either be requested on-demand by the industrial controller 10 or motor controller 30 or scheduled for transmission within the communication module 75 at predefined intervals. It is further contemplated that the on-demand messages may be used for configuration messages on power-up, parameter configuration, and other messages that may be sent infrequently or only when needed.

With reference again to the first cycle 101A illustrated in FIG. 3, the motor controller 30 transmits on on-demand request message 112 to the communication module 75 after completion of the angular position messages and receives an on-demand response message 114 back. The motor controller 30 may be requesting, for example, a value of the temperature of the motor 40 as indicated by the temperature feedback signal 82 generated by a temperature sensor 80 or 81 in the motor 40. The motor controller 30 may be configured to generate an overtemperature message if the value of the temperature feedback signal 82 exceeds a predefined threshold as stored within the motor controller 30. One or more of the request and response messages 112, 114 may be transmitted according to the duration of the total period, $T_{cyc}$, allocated to on-demand messages.

Turning also to the second cycle 101B illustrated in FIG. 3, the on-demand messages may be scheduled to occur at a predefined time within the total period of each cycle. The angular position request and response packets 108B, 110B are again transmitted during the first portion of the total period of the cycle, $T_{cyc}$. At a predefined time within the period, both the motor controller 30 and the communication module 75 are configured to transmit data packets 116, 118 respectively. It is contemplated that these data packets may be, for example, a heartbeat data packet to verify continued communication, a synchronous data packet which may be periodically sent to indicate a present time in each controller and to allow subsequent correction for clock drift or other errors in the periodic cycle, or to transmit data at predefined intervals at the same frequency or at a reduced frequency from the PMW frequency of the motor controller 30. The motor controller 30 and/or the communication module may include a table defining both response/request messages or unidirectional data transfer messages and the frequency at which they need to be transmitted. These on-demand messages are then transmitted according to the stored schedule during the second portion of each cycle.

Figure 4:
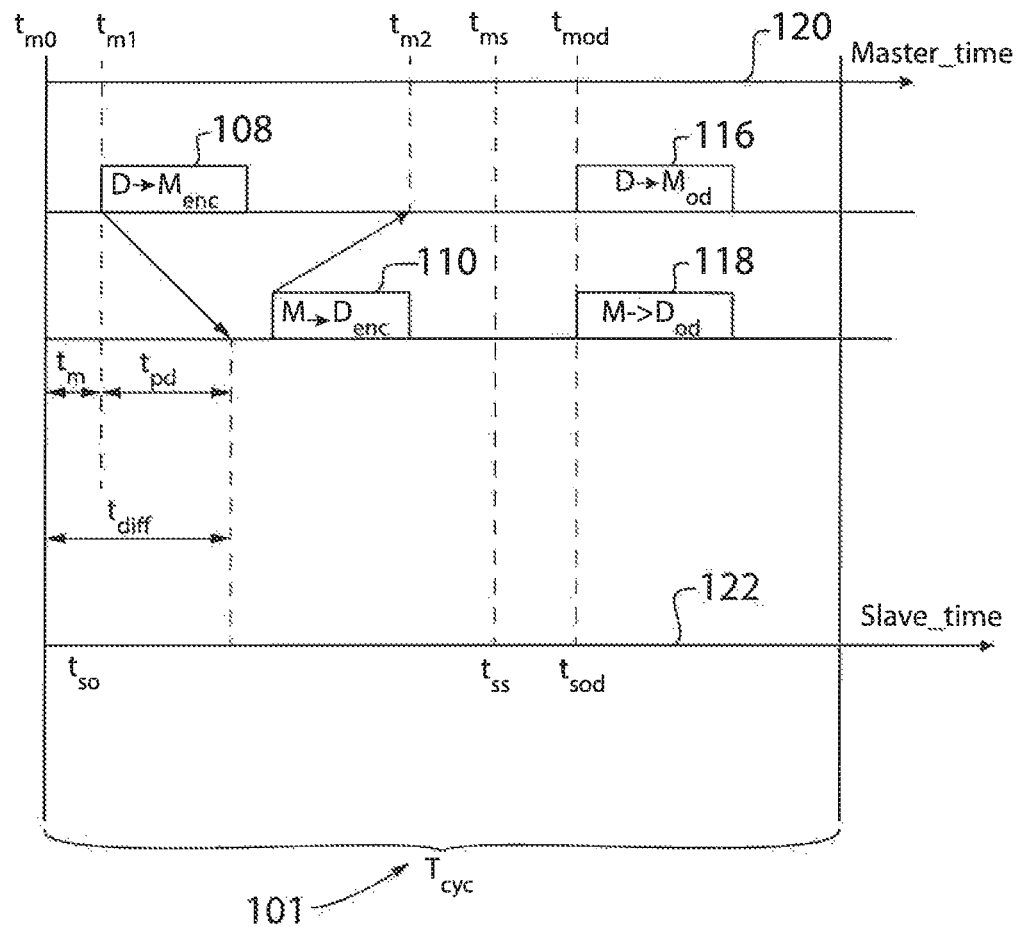
FIG. 4 is a timing diagram of another embodiment of communication between a motor controller and a motor according to the exemplary motion application of FIG. 1.

Turning next to FIG. 4, a second timing diagram, again illustrating transmission of information between the motor controller 30 and the communication module 75 is illustrated. Both the motor controller 30, acting as the master device, and the communication module 75, acting as the slave device, include independent clocks with a corresponding master time 120 and slave time 122, respectively. While the clocks may be synchronized, obtaining synchronous operation between the motor controller 30 and the communication module 75 in the motor 40 does not require that these clocks be synchronized. Rather, the initial synchronization messages 102-106 discussed above are transmitted between the devices to establish synchronous operation. When the communication module 75 receives an initial angular position request packet 108, the communication module 75 is aware of the total cycle time, $T_{cyc}$, and the compensation time, $T_{diff}$, previously sent from the motor controller 30. As a result, the communication module 75 may then begin execution of a synchronous periodic interval within the communication module 75 based on the slave time 122 rather than on the master time 120. At each subsequent cycle, the start of the cycle for the motor controller 30 is represented by the time, $t_{m0}$, and the start of the cycle for the communication module 75 is represented by the time, $t_{s0}$, which, as illustrated, are coincident with each other. The motor controller 30 transmits the angular position request packet 108 at the packet start time, $T_m$, to the communication module 75. The angular position request packet 108 is transmitted within the duration of the transmission delay, $\Delta t$, and arrives at the communication module 75 at the compensation time, $T_{diff}$. The communication module 75, having established its own synchronized periodic cycle, samples the angular position at the start of the cycle, $t_{s0}$, packages the sampled value in a data packet, and transmits the angular position response packet 110 to the motor controller 30. The angular position response packet 110 is received at the motor controller 30 at time, $t_{m2}$.

At a predefined interval within the cycle 101, both the motor controller 30 and the communication module 75 reach a synchronous time, $t_{ms}$ and $t_{ss}$, respectively. It is contemplated that both the motor controller 30 and the communication module 75 may generate a pulse signal at this synchronous time. The pulse signal may be an internal signal within the motor controller 30 and the communication module 75. Optionally, the pulse signals may be provided as an output signal of each device for external observation, for example, by an oscilloscope or other external monitoring device. According to still another option, each pulse signal may be transmitted between devices and used to verify that each device is remaining in synchronous operation. In any event, the synchronous time occurs at a duration within the total cycle, $T_{cyc}$, that is sufficient for the angular position request and response packets 108, 110 to have completed transmission.

After the synchronous time, both the motor controller 30 and the communication module 75 enter the on-demand portion, $t_{mod}$ and $t_{sod}$, respectively, of each cycle 101. It is contemplated that the on-demand time may coincide with or occur at some point within the cycle after the synchronous time, $t_{ms}$ and $t_{ss}$. According to the cycle 101 illustrated in FIG. 4, both the motor controller 30 and the communication module 75 are configured to transmit an on-demand data packet 116 and 118, respectively, at the start of the on-demand portion, $t_{mod}$ and $t_{sod}$, of the cycle.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A system for controlling operation of a motor connected to a motor controller, the system comprising:
   a motor controller operative to execute a control module at a first periodic interval, wherein an output of the control module is a desired voltage for a motor connected to the motor controller to control operation of the motor;
   a first Ethernet communication interface in the motor controller configured to transmit a position read request from the motor controller to the motor at the first periodic interval;
   an encoder operatively connected to the motor, the encoder configured to generate an output signal corresponding to an angular position of the motor; and
   a communication module mounted proximate to the motor operatively connected to the motor controller, the communication module including:
   a second Ethernet communication interface, and
   a processor configured to:
      receive a duration of the first periodic interval from the motor controller;
      execute a second periodic interval at the duration of the first periodic interval and synchronized to the first periodic interval,
      obtain a sampled value of the output signal corresponding to the angular position of the motor from the encoder at a start of the second periodic interval, and
      transmit the sampled value of the output signal corresponding to the angular position of the motor to the motor controller in response to receiving the position read request, wherein the motor controller is configured to output the voltage to the motor to control operation of the motor responsive to receiving the sampled value of the output signal from the communication module.

2. The system of claim 1 wherein the motor controller is further configured to:
   obtain a transmit delay time between the first Ethernet communication interface and the second Ethernet communication interface;
   determine a cycle compensation time as a function of the transmit delay time and of a packet start time; and
   transmit the cycle compensation time and the duration of the first periodic interval from the motor controller to the communication module.

3. The system of claim 2 wherein the processor on the communication module is further configured to:
   receive a data packet from the motor controller;
   generate a time stamp when the data packet is received; and determine a start time for the second periodic cycle as a function of the time stamp and of the cycle compensation time.

4. The system of claim 1 wherein:
the first periodic interval and the second periodic interval each include a first portion and a second portion;
the position read request and the sampled value of the output signal are transmitted during the first portion; and
at least one additional data packet is transmitted during the second portion.

5. The system of claim 4 further comprising:
at least one sensor mounted proximate to the motor, the at least one sensor configured to generate a feedback signal corresponding to a measured operating condition, wherein the processor is further configured to:
receive the feedback signal, and
generate the at least one additional data packet with a sampled value of the feedback signal.

6. The system of claim 4 wherein the at least one additional data packet is configured to be received by a device other than the motor controller and the motor controller is configured to receive the at least one additional data packet and retransmit the at least one additional data packet to the device.

7. The system of claim 1 wherein the first Ethernet communication interface is a first single pair Ethernet communication interface and the second Ethernet communication interface is a second single pair Ethernet communication interface, the system further comprising a single pair Ethernet cable operatively connected between the first single pair Ethernet communication interface and the second single pair Ethernet communication interface.

8. A communication module configured to be mounted proximate to a motor for use in controlling operation of the motor, the communication module comprising:
an Ethernet communication interface; and
a processor configured to:
receive a duration of a first periodic interval from a motor controller, wherein the motor controller is operative to execute a control module at the first periodic interval to determine a voltage for a motor connected to the motor controller,
execute a second periodic interval at the duration of the first periodic interval,
synchronize the second periodic interval of the communication module to the first periodic interval in the motor controller,
obtain a sampled value of an encoder feedback signal at a start of the second periodic interval, wherein the encoder feedback signal is generated by an encoder mounted to the motor and wherein the encoder feedback signal corresponds to an angular position of the motor,
receive a position read request from the motor controller, wherein the position read request is transmitted from the motor controller at the first periodic interval, and
transmit the sampled value of the encoder feedback signal to the motor controller in response to receiving the position read request, wherein the motor controller is configured to output the voltage to the motor to control operation of the motor responsive to receiving the encoder feedback signal from the communication module.

9. The communication module of claim 8 wherein the processor is further configured to:

receive a data packet from the motor controller;
generate a time stamp when the data packet is received; and
determine a start time for the second periodic interval as a function of the time stamp and of a cycle compensation time received from the motor controller.

10. The communication module of claim 8 wherein:
the second periodic interval includes a first portion and a second portion;
the sampled value of the encoder feedback signal is transmitted during the first portion; and
at least one additional data packet is transmitted during the second portion.

11. The communication module of claim 10 wherein the processor is further configured to:
receive an additional feedback signal from at least one sensor mounted proximate to the motor, the additional feedback signal corresponding to a measured operating condition, and
generate the at least one additional data packet with a sampled value of the additional feedback signal.

12. The communication module of claim 10 wherein the at least one additional data packet is configured to be received by a device other than the motor controller and the motor controller is configured to receive the at least one additional data packet and retransmit the at least one additional data packet to the device.

13. The communication module of claim 8 wherein the Ethernet communication interface is a single pair Ethernet communication interface, the communication module further comprising a single pair Ethernet cable configured to operatively connect the single pair Ethernet communication interface to the motor controller.

14. A method for communicating at least one feedback signal between a motor controller and at least one device mounted proximate to a motor operatively connected to the motor controller, the method comprising the steps of:
setting a duration of a second periodic interval, executing on a communication module mounted in the motor, equal to a duration of a first periodic interval, executing on the motor controller, wherein the communication module comprises an Ethernet communication interface;
synchronizing the second periodic interval with the first periodic interval;
sampling a position feedback signal received from an encoder at the communication module at a start of the second periodic interval, wherein the position feedback signal is generated by an encoder mounted to the motor and wherein the position feedback signal corresponds to an angular position of the motor;
receiving a position read request from the motor controller at the communication module, wherein the position read request is transmitted from the motor controller at the first periodic interval; and
transmitting the position feedback signal sampled at the start of the second periodic interval from the communication module to the motor controller responsive to the position read request, wherein the motor controller is configured to:
execute a control module at the first periodic interval to determine a voltage for the motor connected to the motor controller, and
output the voltage to the motor to control operation of the motor responsive to receiving the position feedback signal from the communication module.

15. The method of claim 14 wherein synchronizing the second periodic interval to the first periodic interval further comprises the steps of:
- measuring a transmit delay time from the motor controller to the communication module;
- determining a cycle compensation time in the motor controller as a function of the transmit delay time and of a packet start time; and
- receiving at the communication module the cycle compensation time and the duration of the first periodic interval from the motor controller.

16. The method of claim 15 wherein synchronizing the second periodic interval to the first periodic interval further comprises the steps of:
- receiving a data packet at the communication module from the motor controller;
- generate a time stamp in the communication module when the data packet is received; and
- determining a start time for the second periodic cycle as a function of the time stamp and of the cycle compensation time.

17. The method of claim 14 wherein:
- the first periodic interval and the second periodic interval each include a first portion and a second portion;
- the position read request is transmitted during the first portion;
- the position feedback signal is transmitted during the first portion; and
- at least one additional data packet is transmitted during the second portion.

18. The method of claim 17 further comprising the steps of:
- receiving a feedback signal from at least one sensor mounted proximate to the motor, the feedback signal corresponding to a measured operating condition, and
- generating the at least one additional data packet in the communication module with a sampled value of the feedback signal.

19. The method of claim 18 wherein the at least one additional data packet is configured to be received by a device other than the motor controller and the motor controller is configured to receive the at least one additional data packet and retransmit the at least one additional data packet to the device.

20. The method of claim 14 wherein:
- the motor controller includes a first single pair Ethernet communication interface,
- the Ethernet communication interface on the communication module is a second single pair Ethernet communication interface, and
- a single pair Ethernet cable is configured to operatively connect the first single pair Ethernet communication interface and the second single pair Ethernet communication interface.

* * * * *